United States Patent
Belanger

[11] 3,869,833
[45] Mar. 11, 1975

[54] ROTARY FINISHING WHEEL
[76] Inventor: James A. Belanger, 17505 Rexwood, Livonia, Mich. 48152
[22] Filed: Mar. 21, 1974
[21] Appl. No.: 453,316

[52] U.S. Cl.................. 51/334, 15/183, 15/230.14
[51] Int. Cl............................................ B24b 47/02
[58] Field of Search ........................... 51/334–337; 15/179–183, 230.14

[56] References Cited
UNITED STATES PATENTS

| | | | |
|---|---|---|---|
| 2,174,385 | 9/1939 | Holmes | 51/337 |
| 3,167,800 | 2/1965 | Mundo | 15/179 |
| 3,393,418 | 7/1968 | Mundo | 15/183 |
| 3,685,217 | 8/1972 | Belanger | 51/337 |
| 3,751,745 | 8/1973 | Smith et al. | 51/183 |

Primary Examiner—Othell M. Simpson
Attorney, Agent, or Firm—Whittemore, Hulbert & Belknap

[57] ABSTRACT

The wheel comprises a pad-mounting structure constituted by an axially spaced series of split circular disc-like plate units of aluminum which are coaxially and releasably clamped rigidly to a wheel driving shaft at the ends and between the ends of said structure. Each such plate component is comprised of two substantially identical semi-circular plate halves which directly clamp releasably to the shaft, the plate pairs at axial ends of the assembly each being supplemented by a further similar split plate or disc unit located just axially inward thereof.

All except the two endmost of said split plate units are provided with an annular series of equally spaced holes closely adjacent their outer periphery, which holes slidably receive elongated rods paralleling the shaft axis, upon which axially aligned sets of flexible finishing pads or packs of the wheel are mounted for a very free-swinging action. However, the endmost plates are imperforate in said peripheral zone; and either one or both halves of an endmost plate unit may be taken off the wheel shaft if the finishing pad is to be removed and replaced, as accommodated by an axial sliding movement of a pivot rod. Each half of each split plate unit is provided at its diametral zone with a thickened axial boss or hub formation presenting a semicylindrical seat; and said seats center on the wheel shaft when said halves are releasably bolted to the shaft at said bosses thereof.

7 Claims, 5 Drawing Figures

PATENTED MAR 11 1975 3,869,833

ROTARY FINISHING WHEEL

CROSS-REFERENCE TO RELATED APPLICATIONS

My copending applications generally relating to the subject matter are Ser. No. 253,237, filed May 15, 1972, now U.S. Pat. No. 3,800,481, issued Apr. 2, 1974; Ser. No. 370,461, filed June 15, 1973, now U.S. Pat. No. 3,807,099, issued Apr. 30, 1974 (a continuation of Ser. No. 253,240, filed May 15, 1972 — now abandoned — which was a division of Ser. No. 885,734, filed Dec. 17, 1969 and issued Aug. 22, 1972 as U.S. Pat. No. 3,685,217); Ser. No. 376,812, filed July 5, 1973 (a continuation of Ser. No. 155,733, filed June 23, 1971 — now abandoned); and Ser. No. 424,777, filed Dec. 14, 1973 (a division of Ser. No. 339,352, filed Mar. 8, 1973, which is also a division of said Ser. No. 155,733, now U.S. Pat. No. 3,813,829, issued June 4, 1974).

My more recently filed application, Ser. No. 453,317 filed Mar. 21, 1974, illustrates, describes and claims a variant embodiment of the structure herein disclosed.

BACKGROUND OF THE INVENTION

1. Field of the Invention

The rotary wheel structure is primarily intended, in particular as regards the pad or pack units thereof, for use in commercial automotive car washing establishments. However, the pad-mounting structure of the wheel is suited for more general application, as in buffing wheels, polishing wheels, non-solid type grinding wheels, etc., for the rough or finish abrasive working, brushing, burnishing, or polishing of many kinds of parts.

2. Description of the Prior Art

Patents such as that to Hendrickson, U.S. Pat. No. 2,785,516 of Mar. 19, 1957 disclose a buffing or like wheel structure in which buffing elements are individually mounted in axially aligned sets or series on elongated rods or bars of the wheel. My own patent, U.S. Pat. No. 3,685,217, identified above, also relates to rotary finishing wheel structure which is axially subdivided by intermediate plate means between end plates. However, I know of no prior disclosure of split plate and shaft clamping features such as are referred to in the Abstract.

SUMMARY OF THE INVENTION

The knock-down rotary wheel structure of the invention affords a very free and wide range of swing of pad units mounted thereby in accommodating themselves to the complex contouring of an automobile body; and the said swing of the pads as a group is always well balanced. Moreover, a simple and very standardized design of all of the endmost and intermediate split plate or disc units of the wheel structure makes for a very inexpensive construction cost, as well as a simple and expeditious assembly of knock-down structure, also a dismantling and re-assembly of the components in the event a replacement of a worn pad unit is called for.

DESCRIPTION OF A PREFERRED EMBODIMENT

Figure 1:
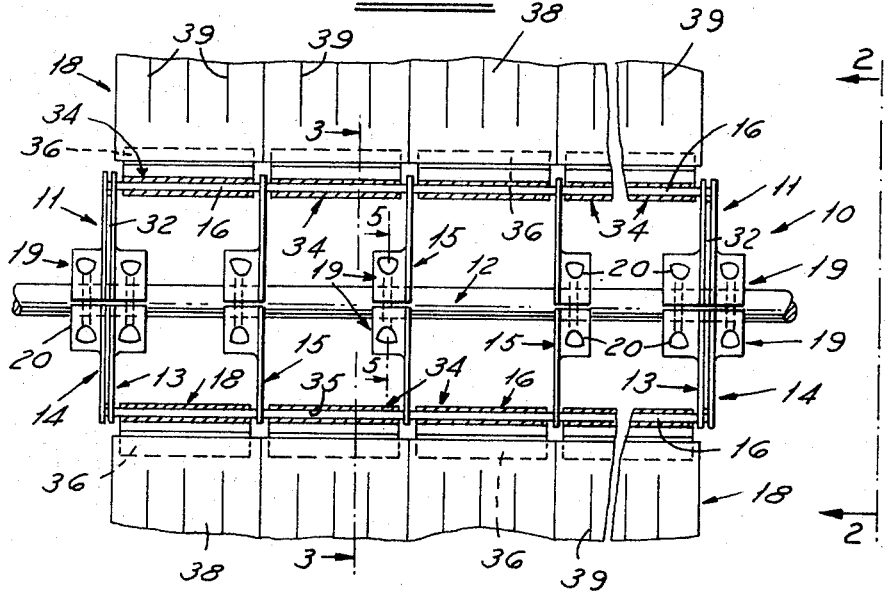
FIG. 1 is a fragmentary side view, partially broken away and in section, showing the finishing pad and wheel structure of the invention as mounted to a drive shaft at split clamped plate units of the wheel.
Figure 2:
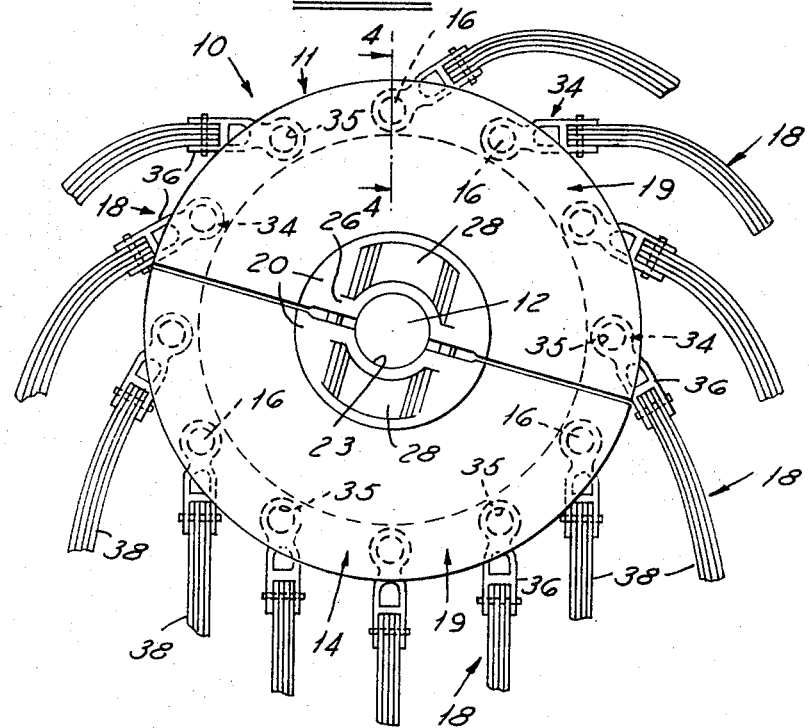
FIG. 2 is a fragmentary enlarged scale view of the wheel structure and its mounted pads, being in end elevation as from the line 2—2 of FIG. 1.

The rotary finishing wheel assembly of the invention, as generally designated by the reference numeral 10, is shown in FIGS. 1 and 2 to comprise a pair of split end plate and shaft clamp units 11 fixedly mounted to a center drive shaft 12, each of said units including an inner two-part disc or plate 13 and outer two-part plate component 14, the specific nature of both of which is later detailed. A plurality of split plate members 15, identical to the inner end plates 13 and shown as three in number, are employed at equally spaced intervals along the length of shaft 12 and between the end units 11; and all of the split plates 13, 14 and 15 are similarly clamped rigidly and releasably to said shaft by like means to be described, thus constituting the wheel structure 10 a readily assembled and dismantled knock-down one. The number of intermediate plates 15 is capable of considerable variation, and their choice as to number and location will be such as to obtain the best-balanced organization possible.

There are a number of extruded plastic hinge or pivot rods 16 of cylindrical cross section which are slidably received in axially aligned holes in the halves of split inner plates 13 and 15 only. These rods serve to hingedly connect to the wheel structure 10 a plurality of finishing pack or pad units, each generally designated 18, the nature of which will hereinafter be described.

Figure 3:
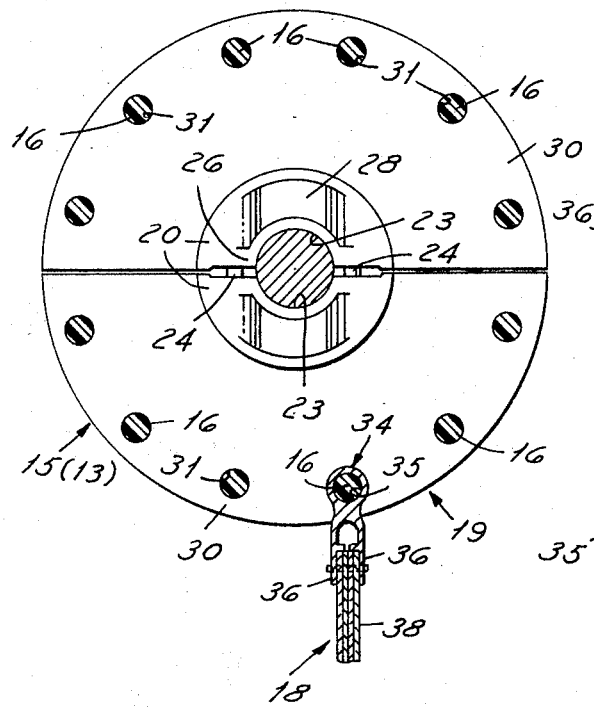
FIG. 3 is a view of an intermediate split plate unit of the wheel, the view being sectioned at 90° to the shaft axis along line 3—3 of FIG. 1.
Figure 5:
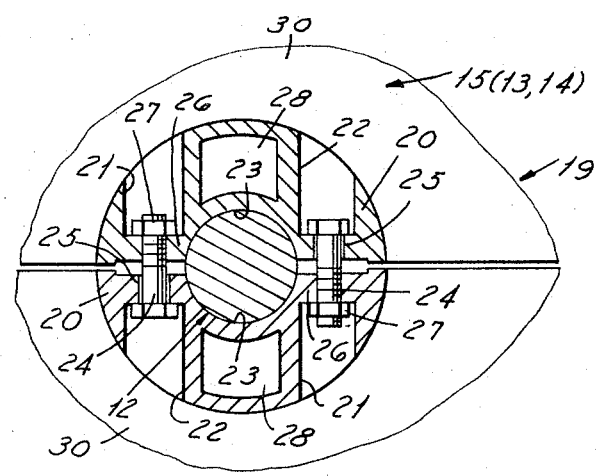
FIG. 5 is a further enlarged scale fragmentary view in radial section on line 5—5 of FIG. 1, illustrating details of the mount of a split plate unit to the wheel shaft.

Now referring particularly to FIGS. 2, 3 and 5 in conjunction with FIG. 1, each of the split plate units or subassemblies 13, 14 and 15 is shown to comprise two almost identical aluminum castings 19 of semi-cylindrical external contour, each formed to provide a radially inner and axially thickened hub-like boss 20; and each such boss has pairs of aligned bores 21, 22 which are in direction substantially tangential to the drive shaft 12 and equidistant from the latter's axis. The castings 19 are also molded to form between such bores a quasi-cylindrical clamp seat 23 which, as best depicted in FIG. 5, will mate on the exterior of said shaft to a greater or lesser degree, depending upon its diameter, and thus properly locate the split units 13, 14 and 15 on the shaft.

A pair of clamp bolts or studs 24, as disposed reversely to enter holes 25 in an inner web portion 26 of each casting 19, have their heads and nuts 27 threaded thereon taken up tightly against those webs, thereby rigidly but releasably clamping the end and intermediate split plates to shaft 11. By preference the castings 19 are molded at their hub bosses 20 to afford weight-reducing cavities 28. As suggested in FIG. 5, there is a reasonable clearance space between the castings 19 adjacent their respective integral webs 26 to enable the split plate units to accommodate themselves to shafts of different diameter.

Each of the semi-circular parts 19 is also cast, as best appears in FIG. 3, to have a radially enlarged integral semi-circular flange portion 30 projecting well beyond its hub formation 20; and the halves 19 of the two inner end plate units 13 and the intermediate plate units 15 are provided adjacent the outer periphery of said halves with an annular series of equally spaced holes 31 of a uniform diameter a bit greater than that of the elongated pad pivoting rods 16, which they are adapted to slidably receive. The corresponding circumferential zones of the flanges 30' of the halves of the two endmost cap components are imperforate, as appears in FIG. 4, since they serve to end-limit the axial movement of the rods 16.

In order to afford a limited axial shift of said rods as guided at the inner plates 13 of the split end plate units 11, said flange 30' of each casting 19 thereof bears an inner integral stop-shoulder 32 of semi-circular outline and lesser radius, terminating short of the circumferential zone of the holes 31 of plate unit 13. These shoulders insure a fairly generous axial clearance space between inner end plate component 13 and the outer circumferential zone of the adjacent outer units 14, as illustrated in FIG. 4.

Figure 4:
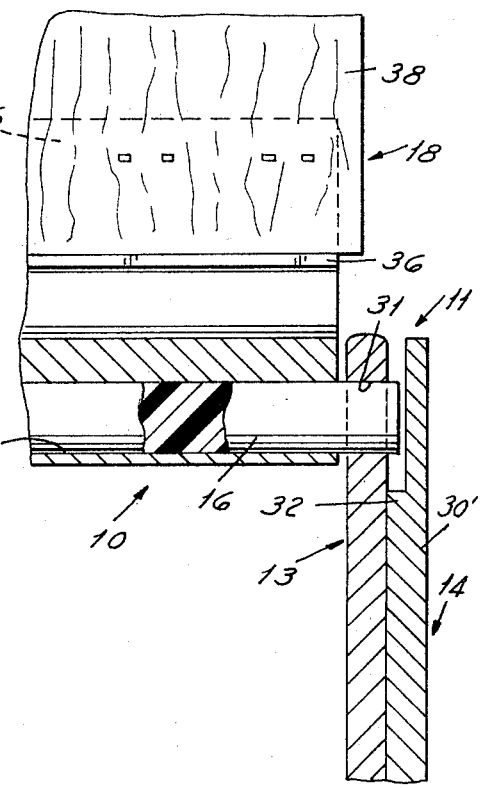
FIG. 4 is a fragmentary enlarged scale view in transverse radial section on line 4—4 of FIG. 2, further showing features of the pivotal mount of a finishing pad unit of the wheel on a plastic hinge rod of the assembly.

As best illustrated in FIGS. 2, 3 and 4, the pack or pad units 18 are received for a very free and antifrictional swinging movement on the multiple axially extending plastic pivot rods 16. This mount is accomplished through the agency of a mounting clip 34 at the inner radial extremity of each pad unit 18, which clip is preferably in the form of an aluminum stamping or extrusion length of the general sort illustrated and described in my U.S. Pat. No. 3,813,829 and 3,800,481. Typically, the radially inner portion of such clip affords a pivoting or hinging bight 35 and a pair of spaced arms 36, between which sheet components of the finishing pad unit 18 are clamped and stapled at their radially inner extremities, project radially outwardly of the bight portion.

FIG. 1 best shows the wheel 10 of the present invention as comprising sheet components in the form of radially much elongated sheets 38 of an appropriate buffing or drying fabric such as treated or untreated felt or other fabric found to be effective in cleaning multiple and complex contours of an automobile. These sheets are shown (FIG. 1) as being longitudinally slitted at 39 along parallel lines extending from very close to the mounting clip 34 throughout the entire remaining longitudinal extent of the sheets. This imparts a great degree of flexibility, adaptability and conformity to the pad units 18 for the special purpose referred to above.

However, it is also contemplated that the wheel structure 10 of the present invention may be employed in the releasable mounting and replacement of pad units of other types, as described in my copending applications referred to above.

In any contemplated installation the axial width of the pad unit 18 will slightly exceed that of its associated mounting and pivoting clip 34, sufficiently as appears in FIG. 1 to bring end edges of the sheet packs in edgewise juxtaposition.

In the setting up of the wheel 10, the casting 19 of one of the end sets of split plates 13 and 14, the corresponding castings of the intermediate plate units 15 and the castings of the opposite inner end plate 13 only will be clamped at their bosses 20 to the wheel shaft 12, with the pad pivoting holes 31 in axial alignment, and after a proper desired axial spacing of said split plates to receive the pad units 18 has been made.

The plastic pad pivoting rods 16 are then progressively passed axialwise through said aligned holes of the plates 13, 14 and 15, starting from the outwardly exposed plate 13, with the mounting clips 34 of the pad units being progressively interpositioned at their bights 35 in the axial spaces between said plates, thus to progressively receive the pivot rods 16. When said rods are fully inserted endwise, the missing end plate castings 19 are applied and clamped to shaft 12 by their bolts 24. Any worn or damaged pad or pack unit 18 may be quickly and easily replaced by removing an end casting 19, retracting a rod 16 and restoring the assembly, in the general manner detailed at greater length in my copending application Ser. No. 453,317, identified above.

I claim:

1. A rotary wheel structure to mount radially outer finishing units, comprising a series of axially spaced split opposite end and intermediate plate units each including two generally similar, semi-circular plates in substantial radial register and having means to releasably clamp the same coaxially in a partially surrounding relation to a drive shaft, there being two of said split end units adjacent each of the ends of said shaft, the axially inner end and intermediate plates of said plate units, as thus clamped, each having means spaced radially outwardly of the axis of said shaft for pivotally mounting said finishing units in circumferentially spaced relation to one another about said shaft axis.

2. The wheel structure of claim 1, in which said plates each have a radially inner seat adjacent its diameter at which it is releasably clamped to said drive shaft, said pivotal mounting means comprising a plurality of elongated rods paralleling the shaft axis and received in a circumferentially spaced series of holes in said plates which surround said axis.

3. The wheel structure of claim 2, in which said end and intermediate plate units are in substance the same save that the axially outer plates of the opposite end plate units lack rod-receiving holes in a circumferential zone thereof radially coinciding with the zone of said series, thereby to axially end-confine rods slidably guided in said holes of other plates of said split plate units.

4. The wheel structure of claim 2, in which said plates are provided at the respective diameters thereof with axially enlarged bosses affording seats which partially encircle said shaft, and means at said bosses to releasably clamp said plates to the shaft.

5. The wheel structure of claim 3, in which said plates are provided at the respective diameters thereof with axially enlarged bosses affording seats which partially encircle said shaft, and means at said bosses to releasably clamp said plates to the shaft.

6. A combined assembly of the wheel structure as defined in claim 2 with a circumferentially spaced array of said finishing units as pivotally mounted on said plate rods of said units, said finishing units each comprising a number of like flexible sheets slitted uniformly along spaced longitudinal lines, and a clip mounting said sheets at ends thereof spaced from said lines in a unitary multiple sheet stack, said clip being provided adjacent a radially inner portion thereof with means connecting the clip to one of said rods.

7. A combined assembly of the wheel structure as defined in claim 3, with a circumferentially spaced array of said finishing units as pivotally mounted on said plate rods of said units, said finishing units each comprising a number of like flexible sheets slitted uniformly along spaced longitudinal lines, and a clip mounting said sheets at ends thereof spaced from said lines in a unitary multiple sheet stack, said clip being provided adjacent a radially inner portion thereof with a bight slidably receiving one of said rods.

* * * * *